United States Patent [19]

Vogel

[11] Patent Number: 5,584,524

[45] Date of Patent: Dec. 17, 1996

[54] LINER FOR TRUCK BED

[76] Inventor: Tony Vogel, P.O. Box 249, Vineburg, Calif. 95487

[21] Appl. No.: 347,830

[22] Filed: Dec. 1, 1994

[51] Int. Cl.⁶ ........................................ B60N 3/04
[52] U.S. Cl. .................... 296/39.1; 296/39.2; 414/509; 414/510; 414/522; 414/786; 224/401; 224/404; 224/539
[58] Field of Search .................. 296/39.1, 39.2, 296/97.23; 414/509, 510, 522, 786; 224/42.42, 42.44, 281, 401, 402–404, 539

[56] References Cited

U.S. PATENT DOCUMENTS

| | | |
|---|---|---|
| 306,922 | 10/1884 | Hild . |
| 1,251,372 | 12/1917 | Hewitt . |
| 1,304,026 | 5/1919 | Craymer . |
| 2,788,137 | 4/1957 | Harkness .............................. 296/26 X |
| 2,898,146 | 8/1959 | Yudenfreund ......................... 296/39.1 |
| 2,911,253 | 11/1959 | Dewey .................................. 296/39.1 |
| 3,381,835 | 5/1968 | Lee . |
| 3,653,710 | 4/1972 | Barnard ................................ 296/39.1 |
| 3,669,817 | 6/1972 | McDevitt ......................... 296/97.23 X |
| 3,726,422 | 4/1973 | Zelin . |
| 4,279,439 | 7/1981 | Cantieri ................................. 296/39.2 |
| 4,303,367 | 12/1981 | Bott ........................................ 414/522 |
| 4,540,213 | 9/1985 | Herlitz et al. ......................... 296/37.5 |
| 4,629,390 | 12/1986 | Burke ..................................... 414/527 |
| 4,681,360 | 7/1987 | Peters et al. .......................... 296/37.6 |
| 4,718,584 | 1/1988 | Schoeny .............................. 224/42.42 |
| 4,733,899 | 3/1988 | Keys ................................. 296/37.6 X |
| 4,749,226 | 6/1988 | Heft ....................................... 296/37.6 |
| 4,750,773 | 6/1988 | Chapline et al. ..................... 296/37.6 |
| 4,828,312 | 5/1989 | Kinkel et al. ......................... 296/37.6 |
| 4,875,730 | 10/1989 | Justice ................................... 296/37.5 |
| 4,877,281 | 10/1989 | Altmann ............................... 290/39.1 |
| 4,890,874 | 1/1990 | Davis ..................................... 296/39.2 |
| 4,917,429 | 4/1990 | Giger ..................................... 296/37.6 |
| 4,979,772 | 12/1990 | Carey et al. .......................... 296/39.1 |
| 5,083,831 | 1/1992 | Foyen ............................... 296/39.1 X |
| 5,110,171 | 5/1992 | Anthony ................................ 296/39.2 |
| 5,184,931 | 2/1993 | Safko ................................. 296/26 X |
| 5,322,335 | 6/1994 | Niemi .................................. 296/97.23 |

Primary Examiner—Dennis H. Pedder
Attorney, Agent, or Firm—Malcolm B. Wittenberg

[57] ABSTRACT

A liner for the loading and unloading of objects for use with a rear-opening truck bed. In use, the liner lies flat and occupies virtually the entire surface area of the truck bed. The liner can be gripped and pulled towards the rear opening of the truck and folded downwardly to enable the user to pull the liner toward the rear opening to access objects which would otherwise be difficult to reach.

7 Claims, 3 Drawing Sheets

LINER FOR TRUCK BED

FIELD OF THE INVENTION

The present invention deals with a liner for the loading and unloading of objects for use with rear-opening truck beds. The liner comprises a substantially flat, two-dimensional sheet which occupies a substantial portion of the truck bed and which can be pulled toward the rear opening of the truck to access objects which would otherwise be difficult to reach.

BACKGROUND OF THE INVENTION

A significant impediment in realizing the full potential of any truck or van having a rear-opening bed is the difficulty one experiences in accessing the entire bed area. In vans, panel trucks, station wagons and similar vehicles, a considerable portion of the load is likely to be disposed well forward where it is rendered wholly inaccessible either by other portions of the load or by the sheer fact that it is extremely difficult to climb within the bed area to remove forward situated objects.

Even in common, every day use, a wide variety of objects from toolboxes to grocery bags are placed on a truck bed through the vehicle's rear opening. However, after the vehicle has been navigated through traffic, these objects oftentimes slide to the front of the bed making unloading extremely difficult. Generally, the operator is likely to be required to climb in and out through the rear gate again and again. There is so little head room within the vehicle that the operator cannot stand erect and is required to maintain a stooping or squatting position while transversing the rear or load area of the vehicle.

Various devices have been proposed for use in conjunction with the rear decks and storage compartments of trucks, vans, station wagons and related vehicles. In each instance, various expedients have been proposed to enable the operator to load and unload the forward and relatively inaccessible area of a bed. However, in each instance, various prior art devices have proven to be complicated, expensive to construct, and, as a consequence, have not been adopted to any significant extent by vehicle manufacturers or by after market installers.

Thus, it is an object of the present invention to provide a flat loading and unloading device which is simple to construct, inexpensive to manufacture and which does not require any modification to the vehicle whatsoever.

This and further objects will be more readily appreciated when considering the following disclosure and appended drawings wherein FIG. 1 is a perspective view of a vehicle in phantom with the present invention installed therein.

SUMMARY OF THE INVENTION

The present invention is directed to a liner for the loading and unloading of objects for use with a rear-opening truck bed. The liner comprises a substantially flat, two-dimensional sheet which occupies a substantial portion of the truck bed surface area. The liner is provided with means for gripping said liner to enable it to be pulled towards the rear opening of the vehicle and fold means are located along the liner substantially parallel to the rear opening such that as the liner is withdrawn from the truck bed, the liner can be caused to fold downwardly once the fold means has passed over the rear opening.

DETAILED DESCRIPTION OF THE INVENTION

Figure 1:
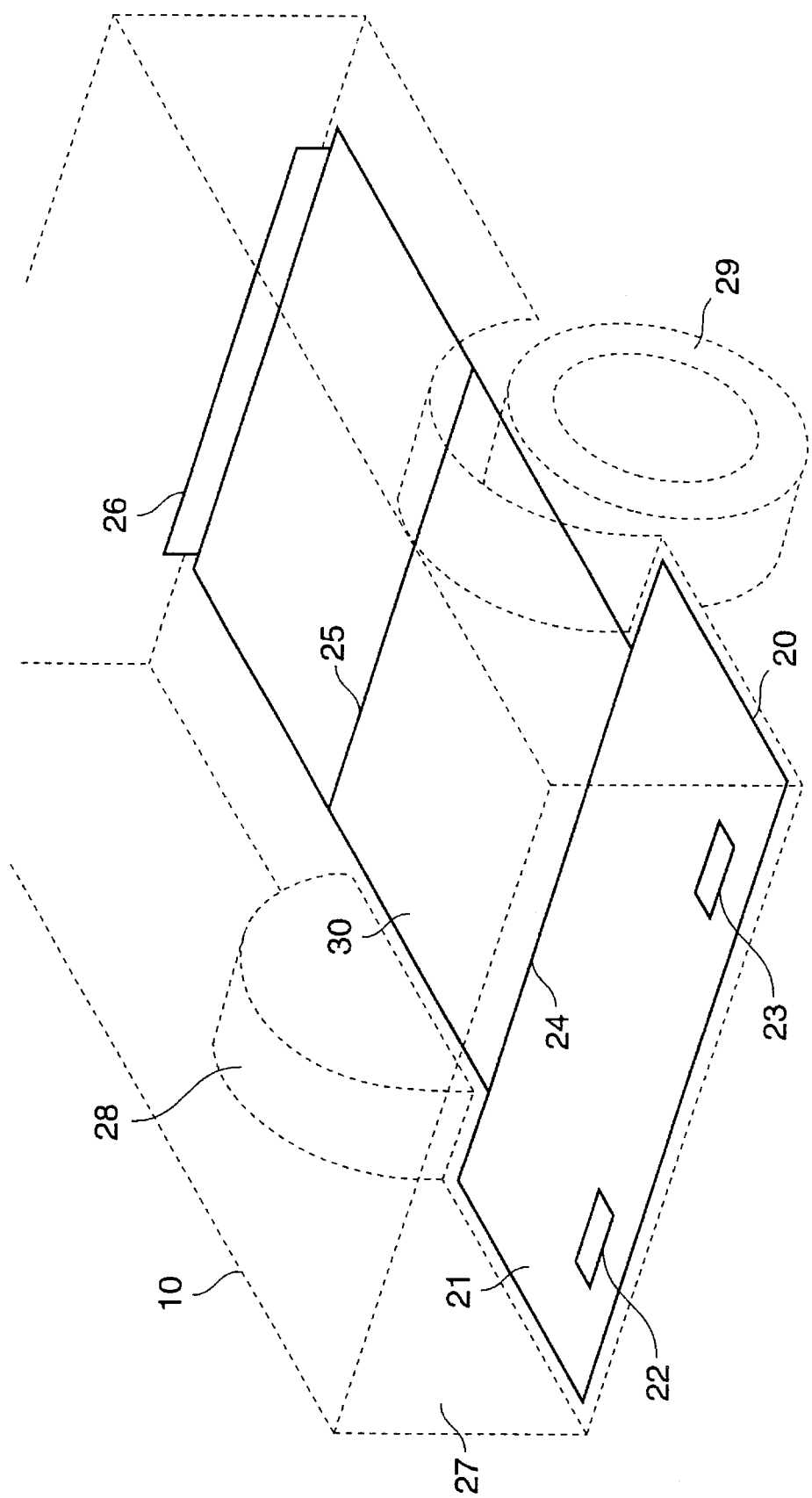

Turning to FIG. 1, the rear portion of vehicle 10 is illustrated in phantom with vehicle opening 27 projecting outwardly. Liner 20 is shown installed in vehicle 10, noting that it is the intent of the present invention to provide liner 20 within the vehicle bed so as to occupy a substantial part and preferably virtually all of the bed area.

As noted, liner 20 comprises a substantially flat, two-dimensional sheet. Objects to be loaded within vehicle 10 are placed on liner 20 as one would load objects onto a vehicle bed, generally. The present invention could also assist in loading the forward section of a vehicle by partially removing the liner and loading objects on the forward portion of it proximate dam 26. Once the liner is pushed forward from rear opening 27, such objects will occupy the forward portion of the vehicle bed.

When removing objects located forward of vehicle 10, liner 20 is intended to be pulled toward its user through rear opening 27. This is facilitated by providing means for gripping the liner shown in the figures as openings 22 and 23 which are sized and positioned to enable a user to conveniently pass his fingers through said openings. Alternatively, handles, pull cords or similar expedients could be provided for this purpose although cut out portions 22 and 23 appear to be most advantageous as they are inexpensive to fabricate and do not provide any intrusion within the vehicle bed.

Figure 2:
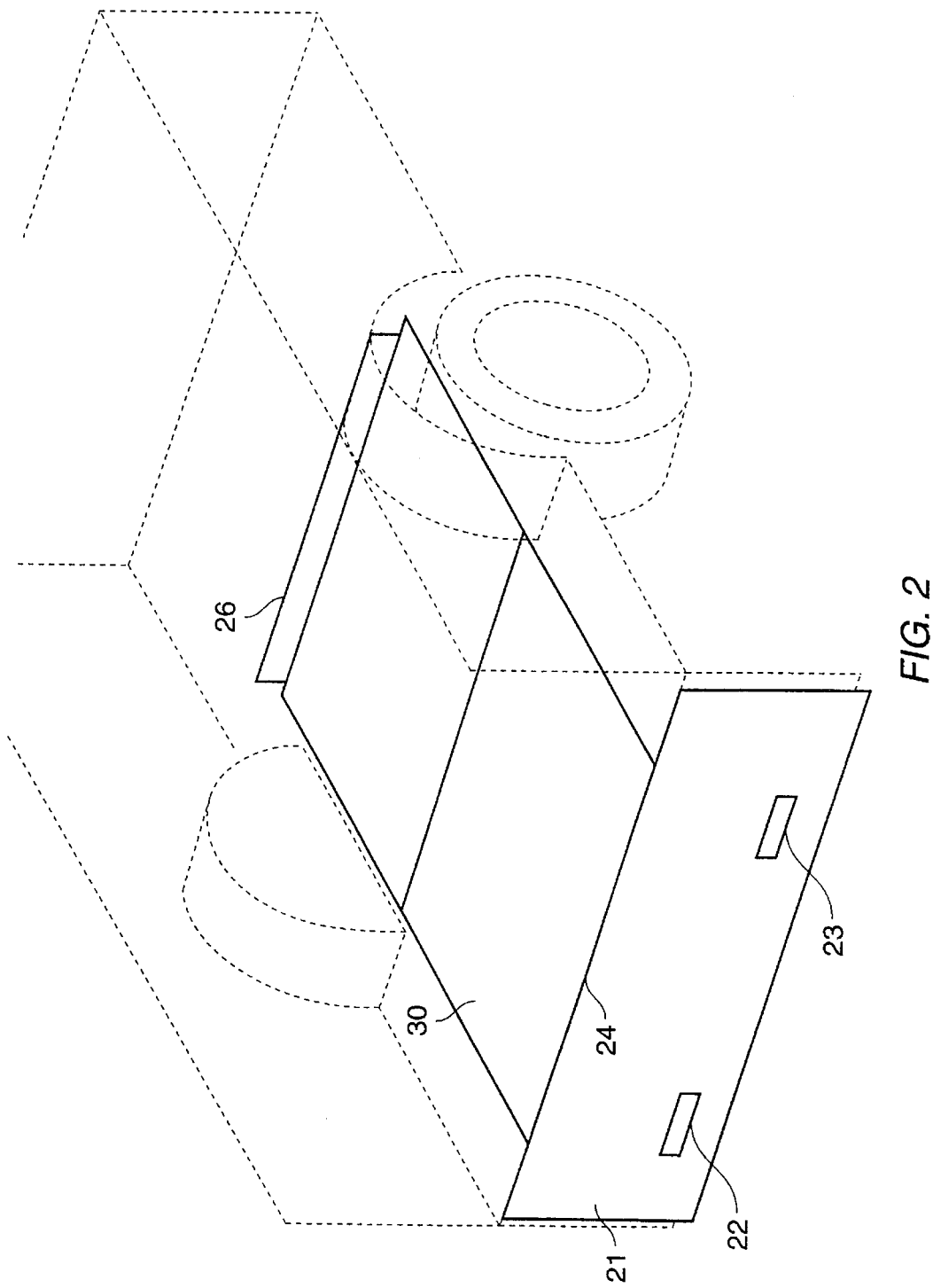
FIG. 2 illustrates the vehicle of FIG. 1 with the liner of the present invention partially removed in order to illustrate its operation.

To further facilitate the removal of forwardly situated objects from the bed of vehicle 10, liner 20 is provided with fold means 24. As shown in FIG. 2, area 21 located proximate rear opening 27 can fold along fold means 24 and drop substantially perpendicularly to the vehicle bed to enhance access to area 30 of liner 20. Fold means can be created by scoring the liner to create fold means substantially parallel to rear opening 27.

As a further expedient, second fold means 25 can be provided enabling liner 20 to be folded in three sections to facilitate the sale and storage of this device. Ideally, the present invention can be configured of corrugated plastic. A suitable material for use herein is sold by U.S. Corrulite Corp. under the trademark CORRULITE™. Fold means 24 and 25 can be provided by creating creases within the corrugated plastic as thinned web portions which generally maintain their structural integrity even after multiple folds have been imposed upon liner 20.

As a further preferred embodiment, liner 20 can be provided with an upwardly extending lip 26 which acts as a dam for engaging objects to be unloaded which may have slid to the forward most section of the vehicle bed. Dam 26 is generally placed on an edge substantially parallel to rear opening 27 and, as shown, is located furthest from rear opening 27 when the liner is installed within the vehicle bed. Ideally, the lip comprises a strip of aluminum 26 which is fixed to liner 20 by riveting or any other well accepted attachment means.

Figure 3:
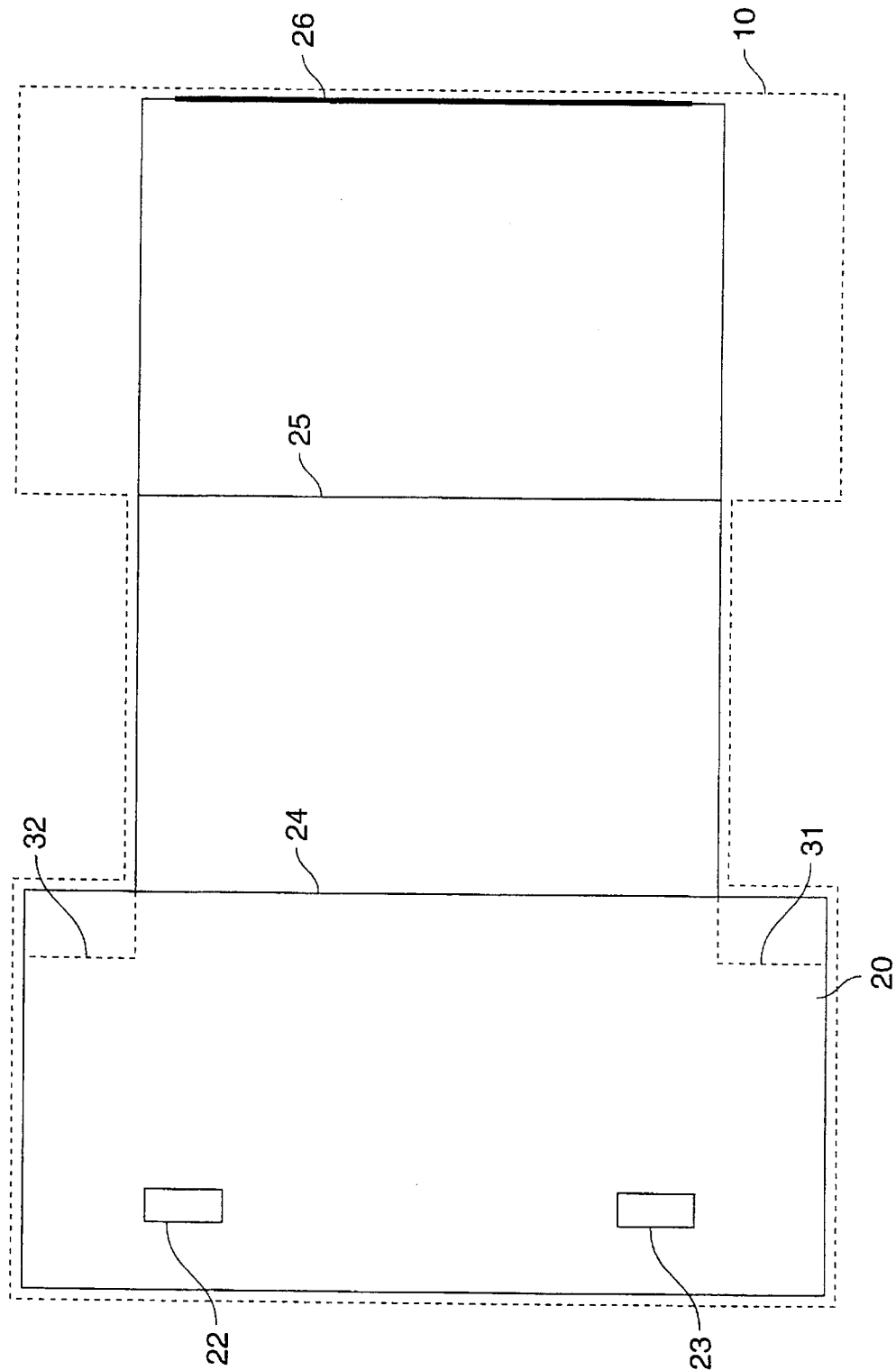
FIG. 3 illustrates, in plan, the liner of the present invention installed on a truck bed.

FIG. 3 which depicts liner 20 in plan illustrates yet a further optional expedient. As noted, in most cases, liner 20 is generally T-shaped, having a narrow segment 30 to accommodate wheel wells 28 and wider rear bed area 21 extending beyond the vehicle's wheel wells. In order to provide for a liner having the ability to universally fit within a wide variety of vehicle beds, perforations 31 and 32 are provided located within rear bed liner area 21 to facilitate removal of liner material within the perforations to accommodate wheel wells of greater dimension.

Although the present invention has been illustrated as a liner for a truck bed having wheel well portions extending within the bed area, the present invention can be employed in a wide variety of rear loading vehicle applications including flatbed trucks, vans, station wagons and sport utility vehicles.

What is claimed is:

1. A method of unloading objects from a rear opening vehicle bed, said method comprises providing a liner in the form of a substantially flat, two-dimensional sheet of corrugated plastic which occupies a substantial portion of said vehicle bed, said liner being provided with a first portion of narrower width for fitting between wheel wells protruding within the vehicle bed and for passing between said wheel wells as said liner is drawn toward said rear opening, said liner further being provided with means for gripping said liner and folding means located along said liner substantially parallel to said rear opening, wherein objects are caused to be unloaded from said vehicle by engaging said gripping means for gripping said sheet and pulling said sheet toward the rear opening of said vehicle bed at least until said folding means passes over said rear opening and downwardly folding that portion of said flat sheet that extends beyond said rear opening to access objects that may reside on said liner from said rear opening.

2. The method of claim 1 wherein said means for gripping comprises cut out portions within said liner located proximate a rear edge of the liner at said rear opening when said liner is installed in said vehicle bed.

3. The method of claim 1 wherein said liner is provided with a second portion of wider width located proximate the rear opening.

4. The method of claim 3 wherein perforations are located within said second portion of wider width to facilitate the removal of liner material within said perforations to accommodate wheel wells of greater dimension.

5. The method of claim 1 wherein at least two fold means are provided substantially parallel to said rear opening to facilitate the folding of the liner for its storage.

6. The method of claim 1 having an edge extending upwardly from said two dimensional sheet of corrugated plastic and which is substantially parallel to said rear opening and located furthest from said rear opening when said liner is installed within said vehicle bed, said edge being provided with an upwardly extending lip for engaging objects to be unloaded which may be in contact therewith.

7. The method of claim 6 wherein said lip comprises a strip of aluminum fixed to said liner.

* * * * *